United States Patent [19]
Pettersen

[11] 3,889,255
[45] June 10, 1975

[54] DIGITAL CALIBRATION SYSTEM FOR AN ELECTRONIC INSTRUMENT

[75] Inventor: Aage Pettersen, North Reading, Mass.

[73] Assignee: Corning Glass Works, Corning, N.Y.

[22] Filed: Mar. 22, 1974

[21] Appl. No.: 453,794

[52] U.S. Cl. .......... 340/347 CC; 73/1 R; 324/30 R; 324/130; 328/162; 235/151.3
[51] Int. Cl. ............................................ H03k 13/02
[58] Field of Search ..... 340/347 AD, 347 CC; 73/1, 73/2–6; 318/601; 328/162, 165; 324/30, 130; 235/151.3

[56] References Cited
UNITED STATES PATENTS

| | | | |
|---|---|---|---|
| 3,316,751 | 5/1967 | Burk | 340/347 CC |
| 3,475,748 | 10/1969 | Price et al. | 340/347 CC |
| 3,491,295 | 1/1970 | Van Saun | 340/347 CC |
| 3,752,969 | 8/1973 | Kiffmeyer | 318/601 X |

Primary Examiner—Charles D. Miller
Attorney, Agent, or Firm—Walter S. Zebrowski; Clarence R. Patty, Jr.; Richard E. Kurtz

[57] ABSTRACT

In a pH measuring instrument, automatic calibration (sloping) is performed by placing the pH electrode in a standard solution, dialing the pH of this standard solution into a decade thumb wheel switch, and depressing the slope switch. The measurement voltage from the electrode is converted to a binary coded digital signal. This signal and the digital signal from the thumb wheel switch are applied to a binary adder which produces a multiple bit output representing the difference. Clock pulses are supplied to a reversible digital counter which counts in a direction specified by the most significant bit of the binary adder output. The count in the reversible counter, representing the error, is converted to an analog signal which is used to control the reference voltage in a ratio system to produce a calibrated reading. The supply of clock pulses to the counter is automatically stopped when the error is zero.

4 Claims, 8 Drawing Figures

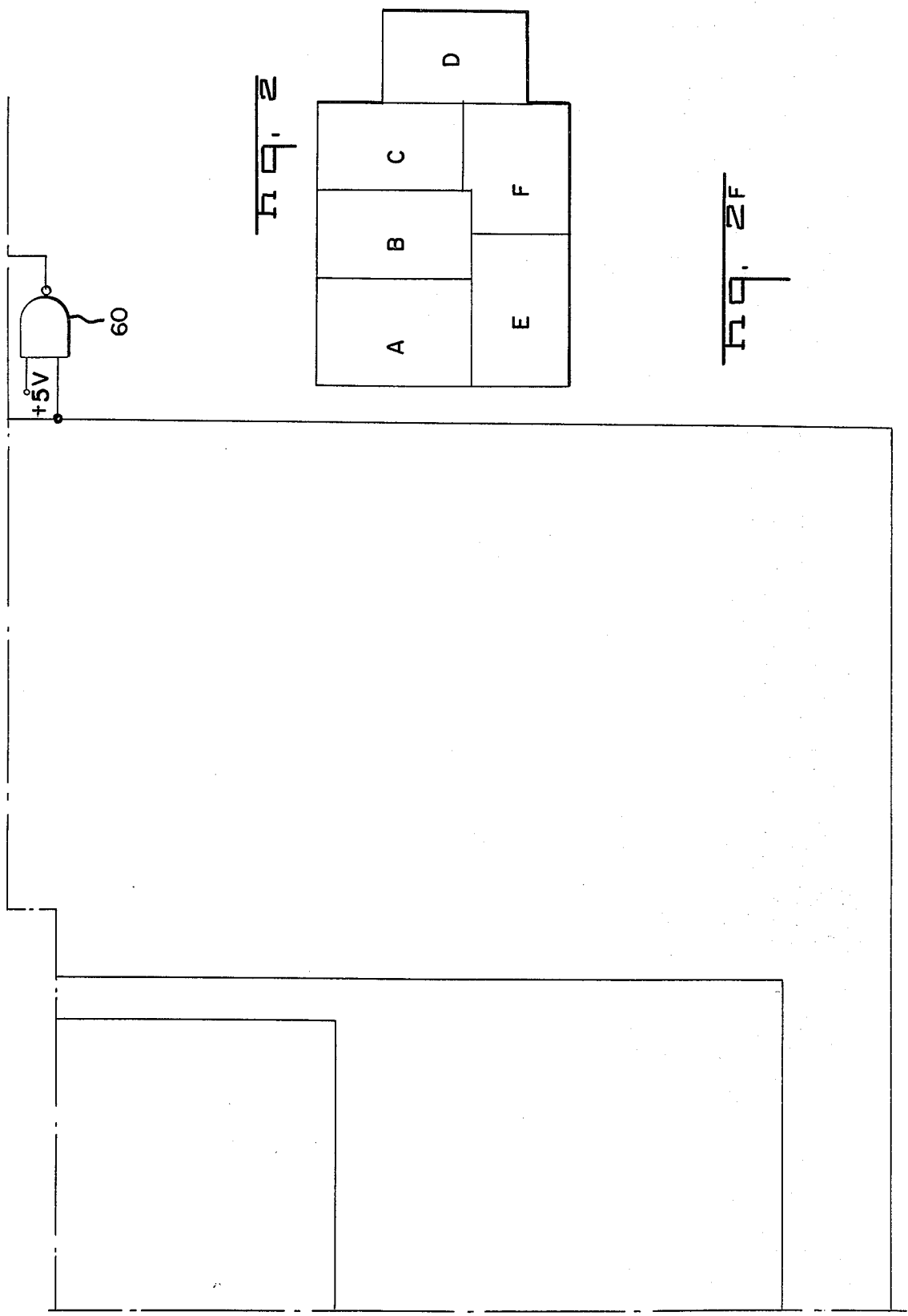

DIGITAL CALIBRATION SYSTEM FOR AN ELECTRONIC INSTRUMENT

BACKGROUND OF THE INVENTION

This invention relates to the calibration of electronic instruments and more particularly to a system for automatically setting the slope of a pH measuring instrument.

The gain of the amplifying circuitry for a pH instrument often changes with age and the output from the pH electrodes generally decrease with age. These changes make it necessary to recalibrate the instrument from time to time. The actual output recorded on the pH indicator may be expressed as:

$$y = ax + b$$

In the above, $y$ is the actual reading, $x$ is the true value and $a$ and $b$ are calibration values which must be set into the instrument to make it read properly. The determination of the $b$ factor is the zero offset of the instrument. A system for automatically calibrating for zero offset is disclosed in copending application Ser. No. 420,967, filed Dec. 3, 1973. The present invention is directed to a system for automatically determining the calibration factor a. This is generally referred to as sloping.

In the prior art this has been manually performed by an operator. This is time consuming and subject to operator error. The prior art has used analog techniques for sloping. An analog voltage is subject to drift over a period of time and this introduces error.

SUMMARY OF THE INVENTION

This invention relates to a system for automatically calibrating an electronic instrument which produces a calibrating measurement voltage in response to a standard during a calibration mode of operation.

The standard value is manually set into a setable switch which produces a binary coded digital signal representing the magnitude of the standard. The measurement voltage from the instrument is converted to a binary coded digital signal. Both binary coded digital signals are applied to a binary adder which produces a multiple bit digital output representing the difference between them. The output of the adder controls the application of clock pulses to a reversible binary counter. The output of this counter is converted to an analog voltage which is used to control the reference voltage in a ratio system (such as a dual slope digital panel meter) to produce a calibrated measurement reading. When the difference signal is zero the supply of clock pulses to the reversible counter is stopped.

In accordance with an important aspect of this invention the carry output of the reversible binary adder is used to control whether the counter counts in the forward or the reverse direction. The use of a reversible counter in this manner makes it possible to apply only a correction from the last calibration operation. This minimizes the time required for calibration.

In accordance with another important aspect of this invention the frequency of the clock pulses supplied to the reversible counter is adaptive in order to minimize the time required for calibration while still providing the desired resolution. The basic clock frequency is divided down to different, related, frequency clock pulses. These different frequency clock pulses are selectively supplied to the reversible counter by gating circuitry. The different bit outputs of the binary adder control the gating. If the most significant digit of the binary adder is off, the highest frequency clock pulses are applied to the reversible counter. Lower significant bits of the binary counter enable other frequency clock pulses to be applied. In this manner the system is adaptive to the magnitude of the difference for which compensation is required.

The foregoing and other objects, features and advantages of the invention will be better understood from the following more detailed description and appended claims.

DESCRIPTION OF THE PREFERRED EMBODIMENT

Figure 1:
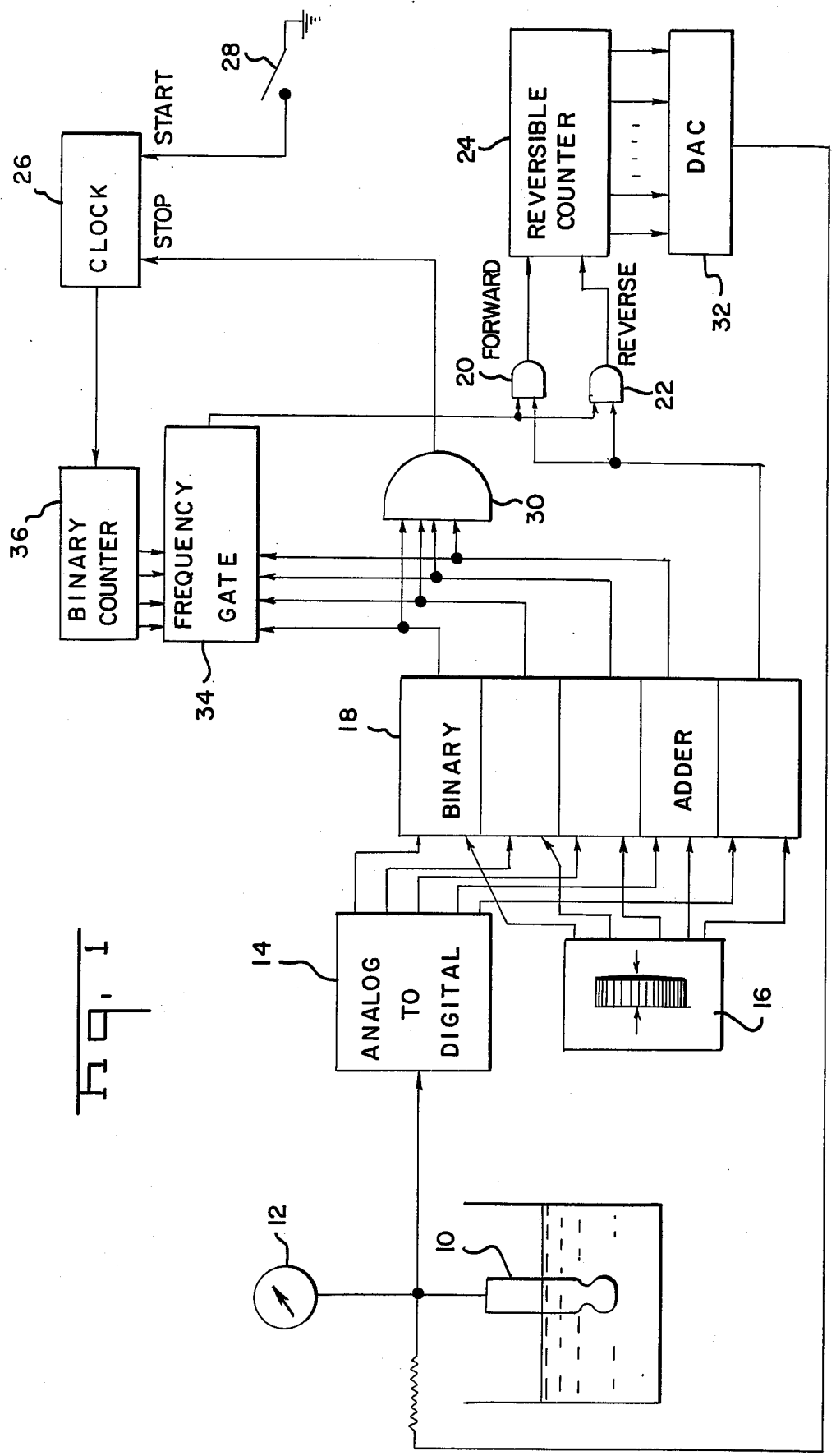
FIG. 1 is a block diagram of the invention.
Figure 2A:
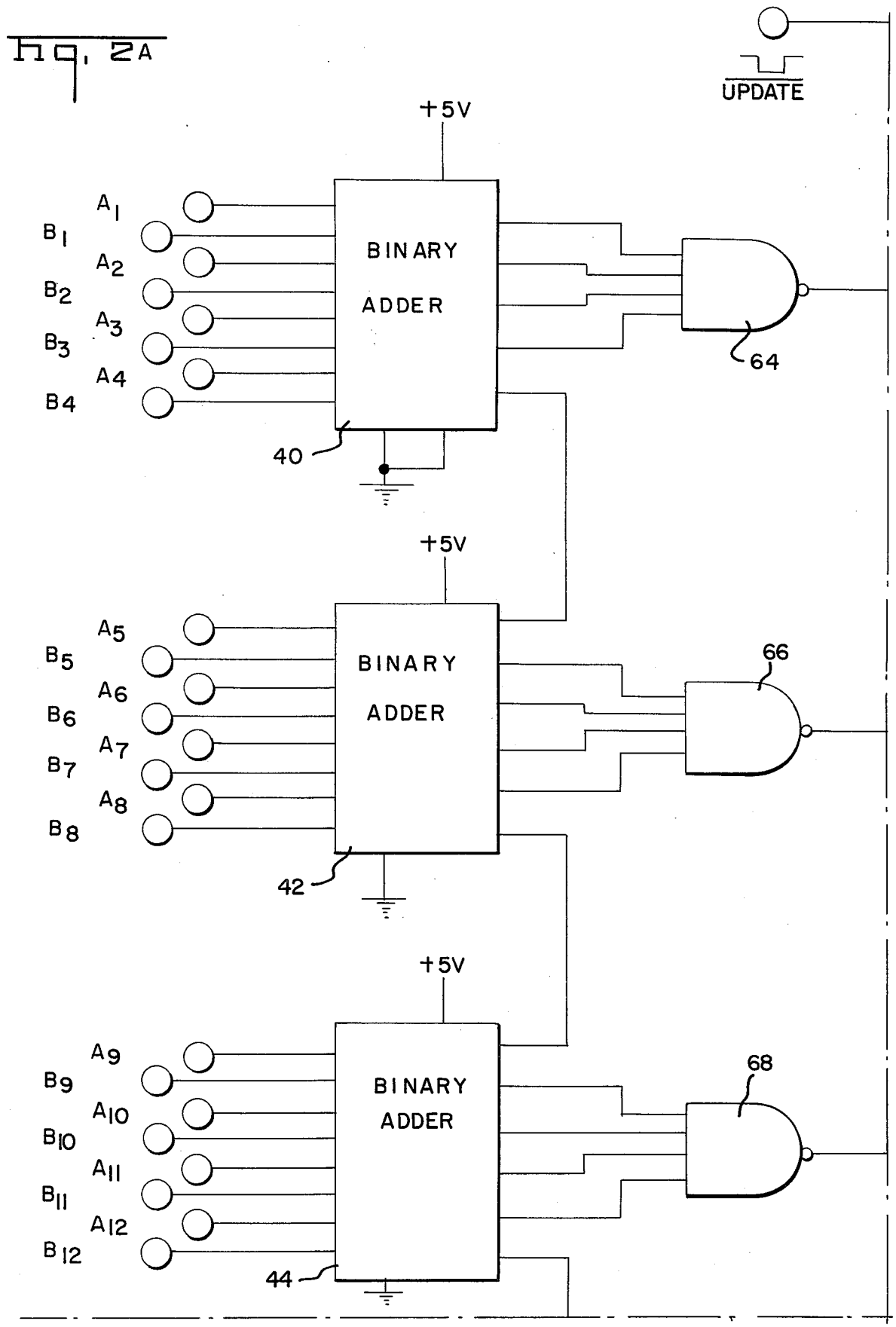
FIG. 2 shows the manner in which FIGS. 2A–2F together form a schematic diagram of the circuit.
Figure 2B:
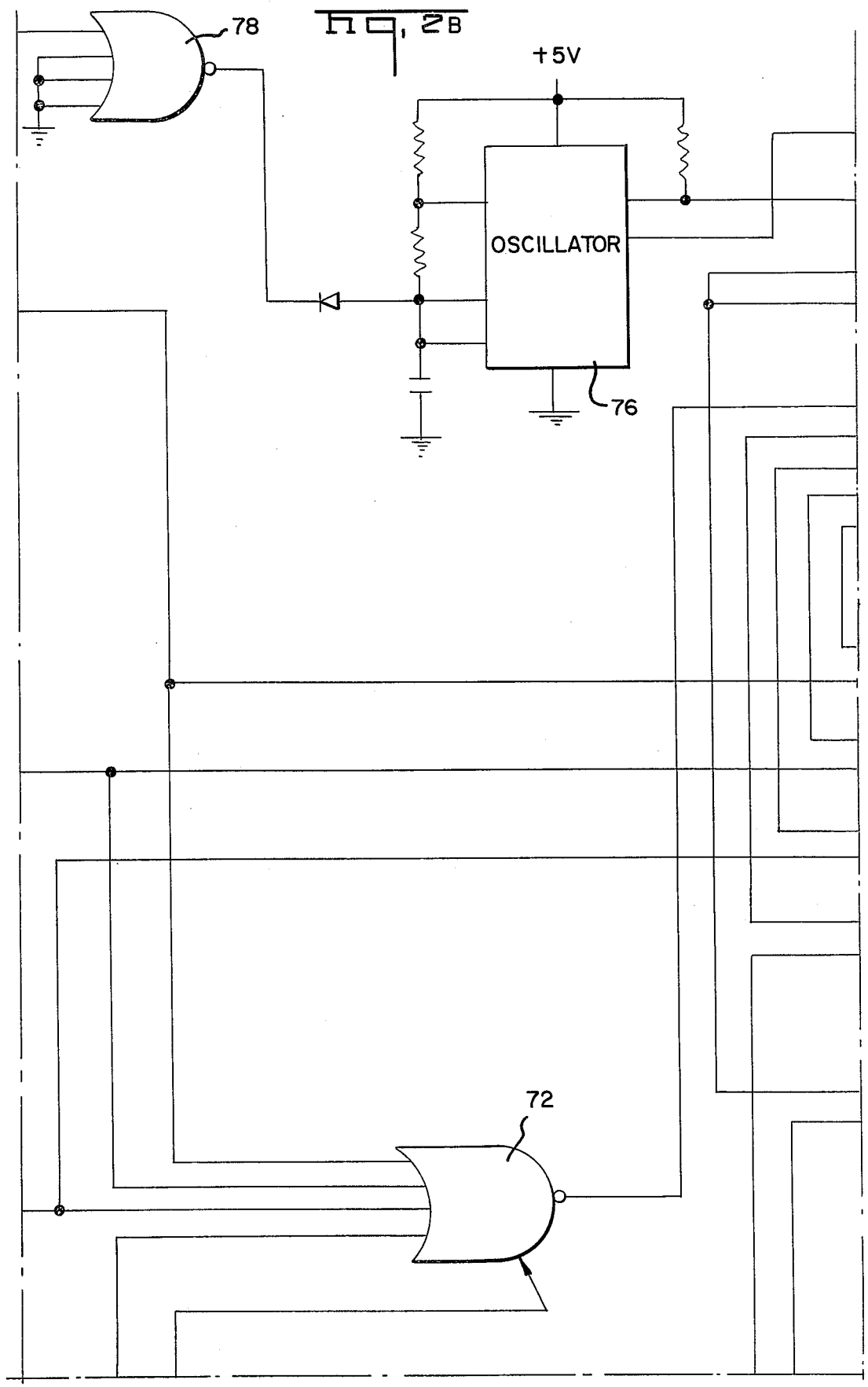
Figure 2C:
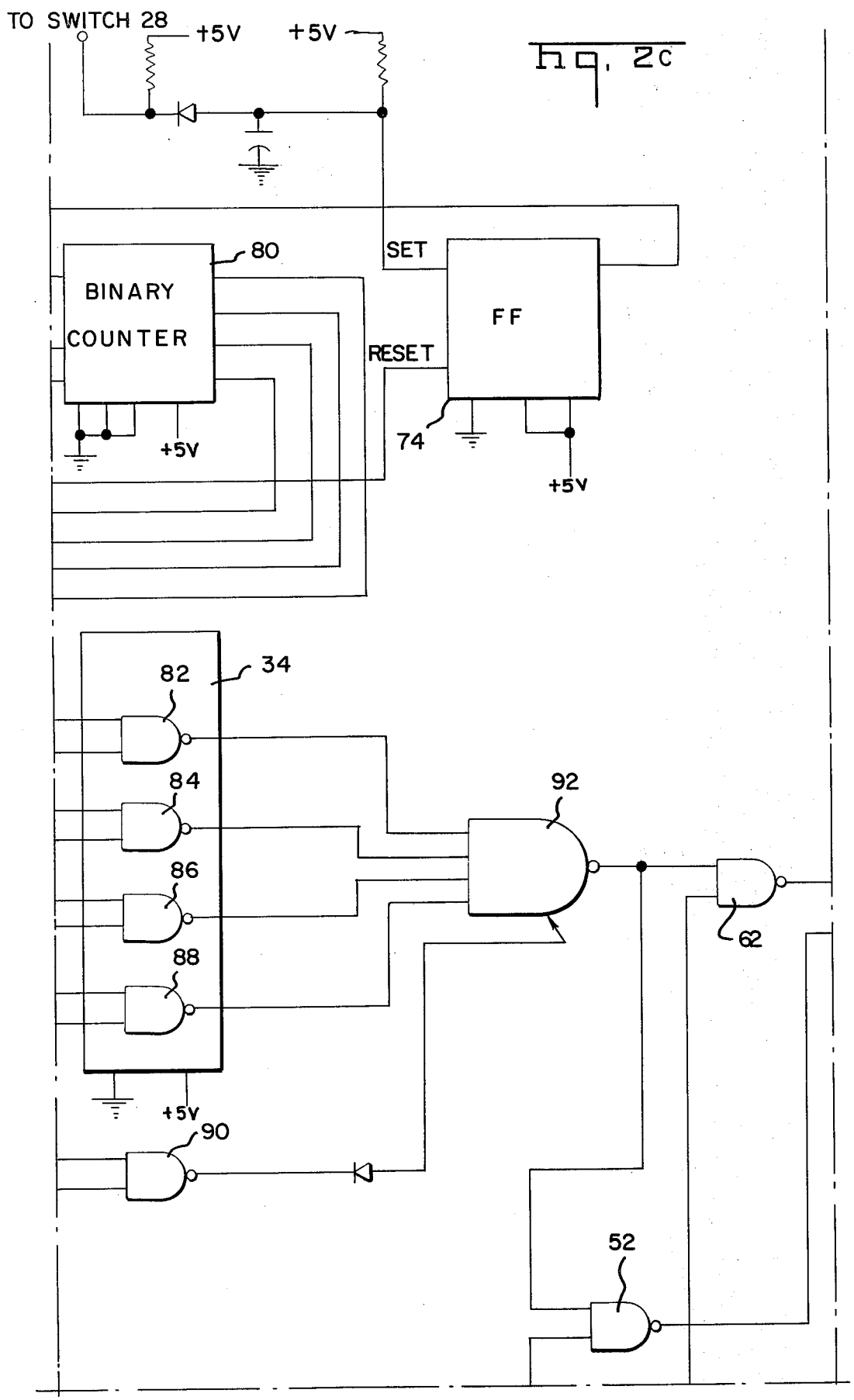
Figure 2D:
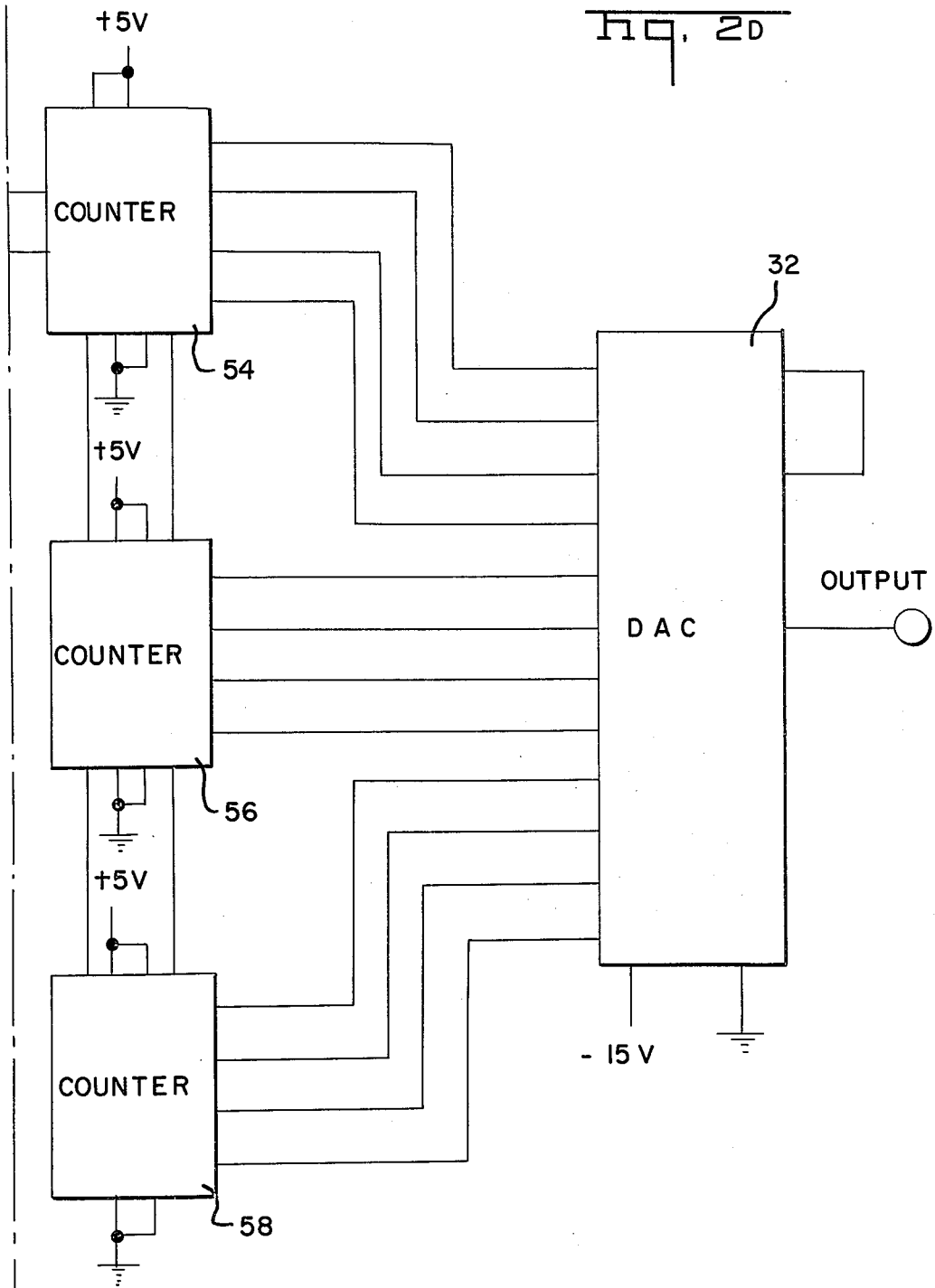
Figure 2E:
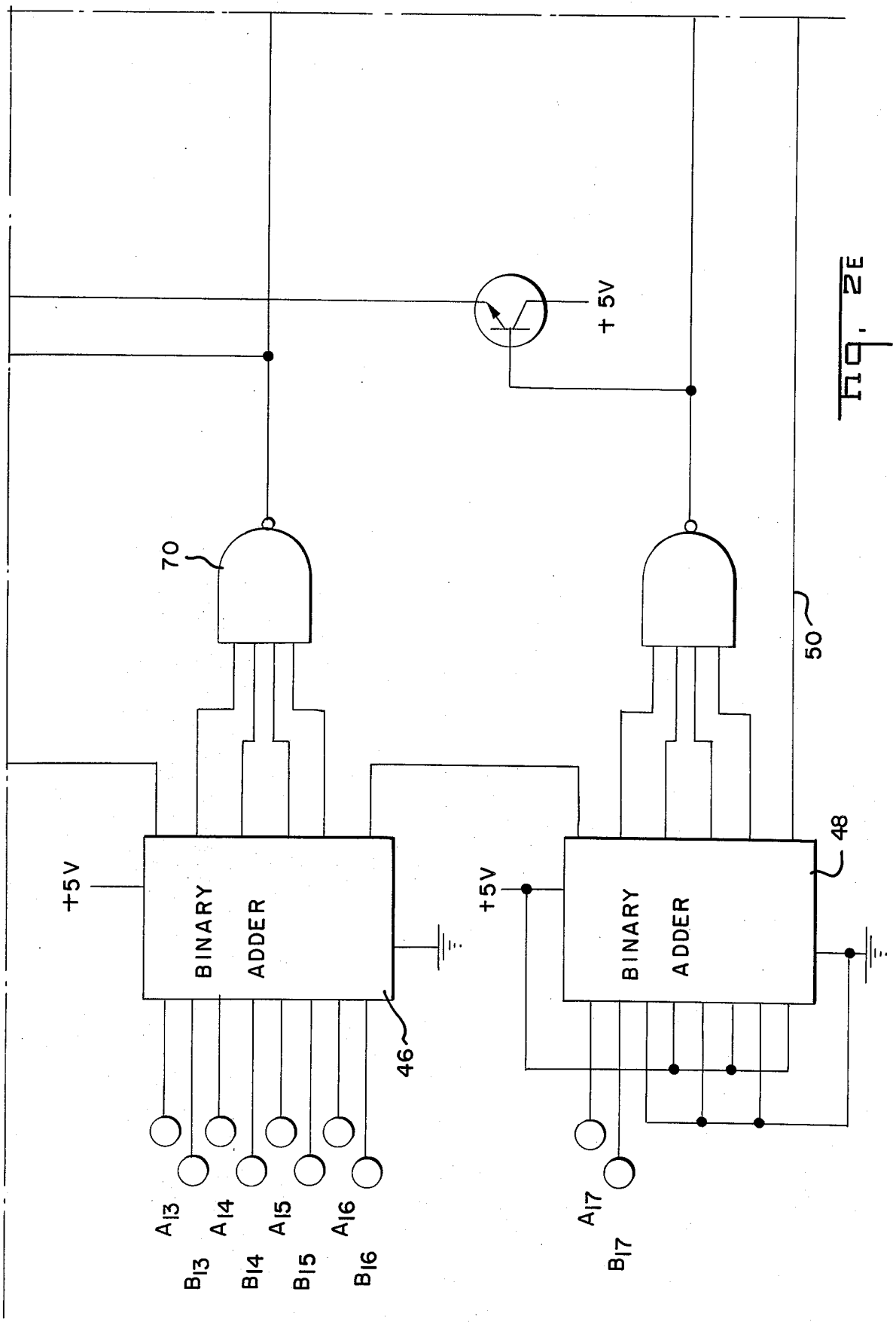

Referring to FIG. 1 the calibration system will be described as applicable to a pH measuring system which includes a measuring electrode 10 and an indicating meter 12 for indicating the pH of a solution in which the electrode is immersed. During a calibration operation the electrode is immersed in a standard solution of known pH.

The calibration system of this invention includes an analog-to-digital converter 14 which converts the measurement voltage to a binary coded digital signal. A manually setable thumb wheel switch 16 is set to the pH of the standard calibrating solution being used. Thumb wheel switch 16 produces a binary coded digital signal representing the magnitude of the pH of the standard calibrating solution. The binary coded digital signals from converter 14 and from thumb wheel switch 16 are applied to a binary adder 18. The binary adder 18 produces a multiple bit digital output representing the difference between the applied inputs. The most significant bit is applied to the gates 20 and 22. These gates determine whether the reversible counter 24 counts in the forward or the reverse direction.

Clock pulses supplied to the reversible counter 24 originate in the clock 26. This clock is started by the operator who manually depresses the switch 28.

The multiple bit digital output of binary adder 18 is applied to a gate 30 which detects when the difference is zero. When the difference is zero, the output of gate 30 stops the clock 26. In this manner, the count in the reversible counter 24 is proportional to the difference between the magnitude of the standard as set by the manual switch 16 and the measured magnitude of the standard. The count in the reversible counter 24 is converted to an analog voltage by the digital-to-analog converter 32. This analog voltage is used to control the reference voltage in a ratio system to produce a calibration reading. Typically, the ratio system includes a dual slope digital panel meter.

The frequency of the clock pulses supplied to reversible counter 24 depends on the magnitude of the difference. This makes the system adaptive. If the difference is great, high frequency clock pulses are supplied to reversible counter 24. If the difference is small, lower frequency clock pulses are provided. In this manner, the time required for calibration is minimized whereas the system still has sufficient resolution. In order to do this, the multiple bit outputs of the binary adder 18 are applied to a frequency gate 34. The basic clock pulse frequency from clock 26 is supplied to the binary counter 36. This divides the basic clock frequency to produce outputs of different frequency clock pulses. Different bit outputs of binary adder 18 enable different frequency clock pulses to pass through the frequency gate 34. High frequency pulses pass when the difference represented by the digital output of adder 18 is large whereas a lower frequency of clock pulses is applied to the gates 20 and 22 when the difference is small.

The circuit diagram is shown in FIG. 2. The inputs from the analog-to-digital converter 14 are labeled $A_1$ through $A_{17}$. The inputs from the thumb wheel switch 16 are labeled $B_1$ through $B_{17}$. These inputs are applied to the binary adders 40, 42, 44, 46 and 48. These binary adders produce a multiple bit digital output representing the difference between the measured standard and the value of the standard set into the thumb wheel switch. If the measuring voltage is low relative to the value set into the thumb switch, the carry output on the line 50 will be high. This enables gate 52 which supplies clock pulses to the countdown input to the reversible counters 54, 56 and 58. Alternatively, when the measured voltage is high relative to the value set into the thumb wheel switch, the carry output on line 50 is low. This is inverted by inverter 60, the output of which enables the gate 62 to supply clock pulses to the countup input of counters 54, 56 and 58.

The multiple bit outputs of binary adders 40, 42, 44, 46 and 48 are applied through gates 64, 66, 68 and 70 to the decoding gate 72. When the difference between the measured voltage and the value set into the thumb wheel switch is zero, all of the outputs of binary adders 40–48 are high, and the output of gate 72 resets the flip-flop 74. Flip-flop 74 is set at the beginning of a calibration cycle by the switch 28. It is reset when the correct calibration, or slope is detected.

The oscillator 76 is enabled to produce the basic clock pulses when the flip-flop 74 is set. The oscillator 76 is gated on only between UPDATES of the digital panel meter. In order to do this the oscillator 76 is enabled by the gate 78 in response to an $\overline{\text{UPDATE}}$ signal. Because of this, a calibration can be performed only between UPDATES.

The basic clock pulses are counted down by the binary counter 80 which produces outputs of different frequency pulses. The lowest frequency is applied to the gate 82 which is turned on by the least significant bit output of binary adder 40. Increasingly higher frequency pulses are applied to gates 84, 86 and 88 which are respectively turned on by the higher order bits of the binary adders. The outputs of gates 82–90 are applied to the OR gate 92. The output of OR gate 92 is a pulse train which is supplied through either gate 52 or 62 to the reversible counter.

What is claimed is:

1. An automatic calibration system for an electronic instrument which produces a measurement voltage and which produces a calibrating voltage in response to a standard during a calibration mode of operation comprising:

means for converting said calibrating voltage to a binary coded digital signal, manually settable switch means producing a binary coded digital signal representing the magnitude of said standard, a binary adder, the binary coded digital signals from said means for converting and from said manually settable switch means being applied to said binary adder, said binary adder producing a multiple bit digital output representing the difference between the applied digital signals, a digital counter, a source of clock pulses, gating means, said multiple bit digital output being connected to said gating means, said clock pulses being applied through said gating means to said counter, said gating means being connected to stop the application of pulses to said counter when said difference is zero so that said counter counts a number of pulses related to said difference, and a digital-to-analog converter responsive to the outputs of said counter to produce an analog output voltage related to said difference, said analog output voltage controlling said instrument to produce a calibrated measurement voltage.

2. The system recited in claim 1 wherein said digital counter is reversible, the carry output of said binary adder being connected to said gating means to control the application of clock pulses to the countup or countdown input of said reversible digital counter.

3. The system recited in claim 1 wherein said electronic instrument is in a ratio system for ph measurement and wherein said analog output voltage is applied to control the reference voltage in the ratio system to produce a calibration reading.

4. The system recited in claim 1 wherein said source of clock pulses includes:

an oscillator, binary counters, the output of said oscillator being applied to said binary counters so that said binary counters produce outputs of different frequency clock pulses, a frequency gate, said multiple bit output from said binary adder being applied to said frequency gate, said different frequency clock pulses from said binary counters being applied to said frequency gate so that different bit outputs of said binary adder enable different frequency clock pulses to pass through said frequency gate whereby the frequency of the pulses applied to said reversible counter is proportional to the magnitude of said difference.

* * * * *